T. & W. MOSS.
FLUID PRESSURE MOTOR AND PUMP.
APPLICATION FILED MAR. 2, 1907.

950,945.

Patented Mar. 1, 1910.
2 SHEETS—SHEET 1.

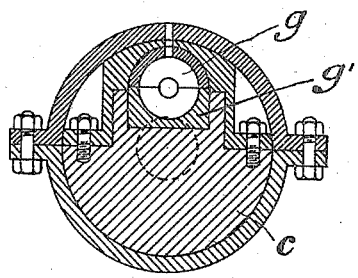
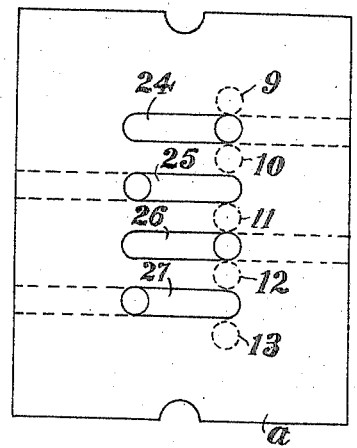
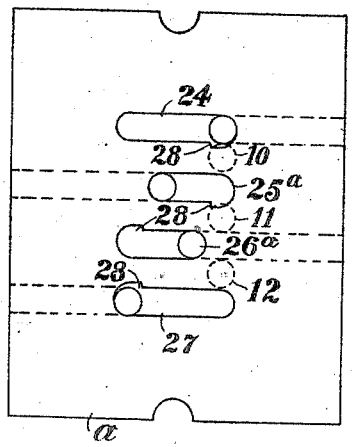

UNITED STATES PATENT OFFICE.

THOMAS MOSS, OF PORTSMOUTH, AND WILLIAM MOSS, OF WIGAN, ENGLAND.

FLUID-PRESSURE MOTOR AND PUMP.

950,945.

Specification of Letters Patent.   Patented Mar. 1, 1910.

Application filed March 2, 1907.   Serial No. 360,127.

*To all whom it may concern:*

Be it known that we, THOMAS MOSS, engineer, and WILLIAM MOSS, wheelwright, subjects of the King of Great Britain, residing, respectively, in Portsmouth, in the county of Hants, and Wigan, in the county of Lancaster, both in the Kingdom of England, have invented certain new and useful Improvements in Fluid-Pressure Motors and Pumps, for which application has been made in Great Britain, No. 6,507, dated March 17, 1906; France, filed November 12, 1906, and Belgium, filed November 12, 1906.

This invention has for its object improvements in steam or other fluid pressure engines capable under certain conditions of being used as pumps, the engines being of the type in which there is a reciprocating piston, which in its reciprocation is also oscillated owing to its connection with a rotatable disk by means of a pitman.

The several novel points of the invention and the construction of the same will be clearly brought out in the following specification with reference to the accompanying drawings, in which a construction embodying the principles of the invention is illustrated.

Figure 1:
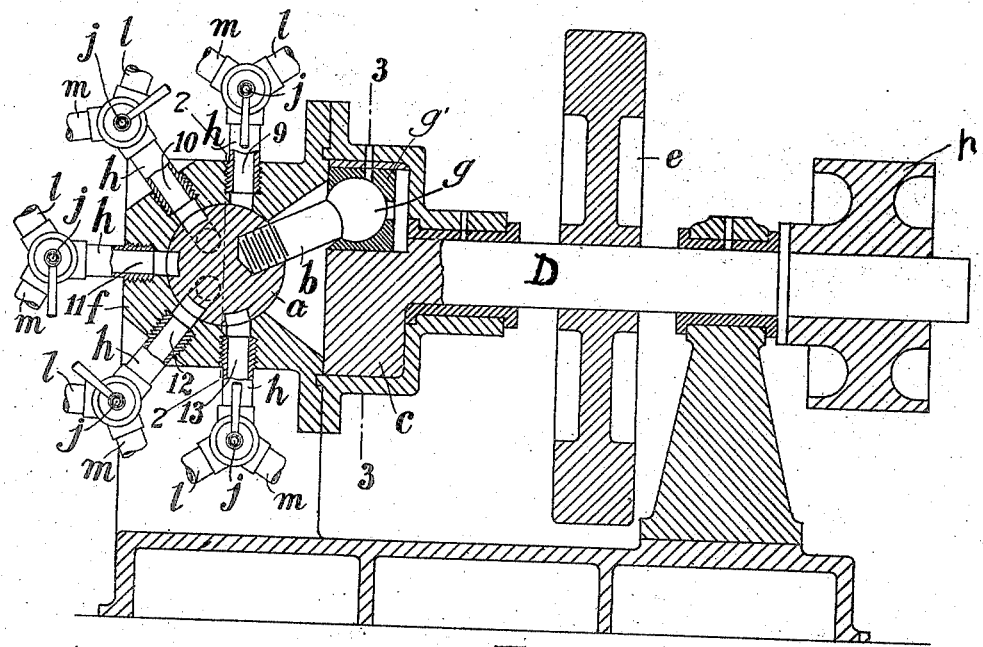
Figure 2:
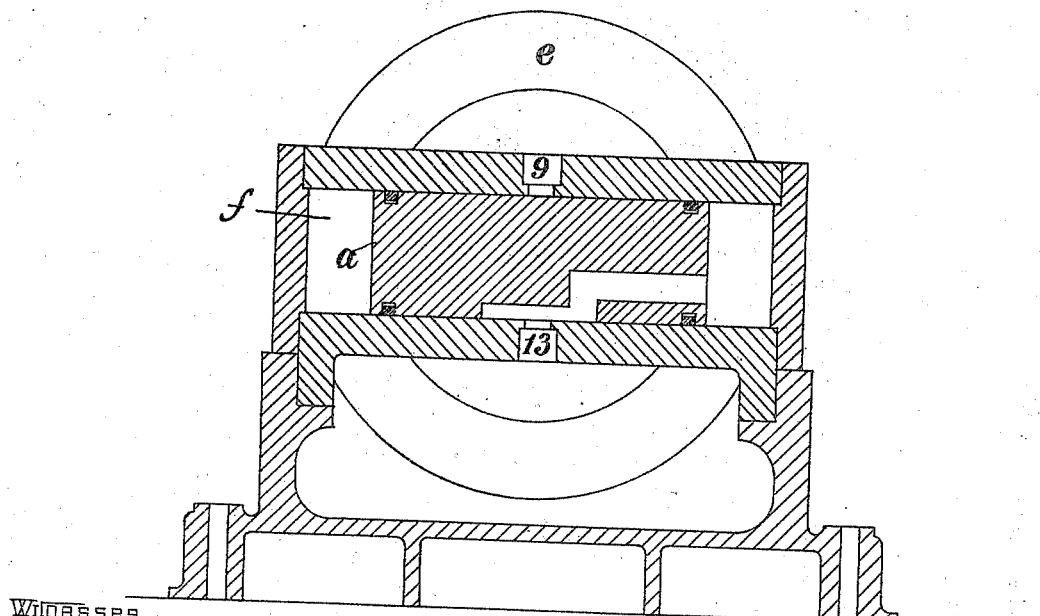

In the drawings: Figure 1 is a sectional elevation of the engine; Fig. 2 is a section on the line 2—2 of Fig. 1; Fig. 3 is a section on the line 3—3 of Fig. 1; and Figs. 4 and 5 are developments of the piston showing the arrangement of the ports first for the reversible engine capable of also being run as a pump, and secondly of the engine arranged so as to use the steam expansively and give the valves a certain amount of lead.

In the description it will be supposed that the engine is to be operated by steam, although it is obvious that it can be operated by any elastic fluid, or in the arrangement hereinafter described as a pump can be operated hydraulically. The piston *a* is provided with a pitman *b*, which engages in a rotatable disk *c* rigidly connected to the main shaft *d*, carrying the fly-wheel *e*. The piston *a* reciprocates in the cylinder *f*. The pitman *b* has an enlarged spherical head *g* fitting in a socket in a sliding-block *g'*, which is capable of sliding in the rotatable disk *c*. It will be obvious that, on the piston being reciprocated, the disk *c* will be rotated, and in its rotation will give an oscillation to the pitman *b* and, therefore, to the piston *a*. The cylinder *f*, as shown, is provided with five ports 9, 10, 11, 12, 13, while the piston is provided with only four ports 24, 25, 26 and 27. The ports in the cylinder are connected up to suitable cocks so that they can be either cut off, connected with the exhaust or with the steam supply at will.

As shown in the drawings, the ports 24 to 27 extend at a right-angle to the longitudinal axis of the piston and communicate with open slots arranged in pairs on the face of the piston and extending substantially from the center thereof through the piston in opposite directions to the respective ends thereof.

To enable the apparatus to operate as a reversible engine, the arrangement of the ports, in the piston and cylinder, shown in Fig. 4 is adopted. For one direction of running the ports 9 and 13 in the cylinder are shut off, 11 becomes the inlet port, 10 and 12 exhaust ports. It will then be seen from Fig. 4 that, as the piston is moved, the port 25 will come over the port 11, admitting steam thereto; at the same time the ports 24 and 26 will come over the ports 10 and 12, thereby opening the other end of the piston to the exhaust through two ports. On the return stroke the port 26 will come over the inlet port 11, which will thereby act as the inlet port, while the ports 25 and 27 will come over the exhaust ports 10 and 12, and so provide two exhaust passages for the steam which was previously admitted by a single inlet passage, namely 25. In this direction of running it will be seen that ports 25 and 26 in the piston are used for both exhausting and admitting steam, while the ports 24 and 27 are only used for exhausting steam, and then only in conjunction with the ports 25 and 26. For running in the opposite direction, the port 12 (or 10) is shut off, port 10 (or 12) becomes the steam port, while 9, 13 ad 11 in the cylinder become exhaust ports. It will then be seen that the port 25 will move over the port 10, admitting steam to one end of the cylinder, while at the same time the ports 24 and 26 will move over the respective ports 9 and 11 through which the steam will exhaust. On the return stroke, the port 24 will move over the port 10, admitting steam thereto, while the ports 25 and 27 will move over the ports 11 and 13 which act as exhaust ports for the steam previously admitted through the port 25 in the piston from the port 10 in the cylinder. In this case, it will be seen that the ports 24 and 25 are used as steam ports and exhaust ports, while 26 and 27 are only used as exhaust ports. Any suitable differential gear is connected to the valves, so that by the turning of the handle the necessary alterations of the respective ports from steam ports to exhaust ports, and the opening and shutting of them to bring out the reversal of the engine, is provided.

If it be desired to run the engine as a pump, the port 12 in the cylinder is opened, and it will then be obvious that the inlet and outlets will be equal so that a non-elastic fluid could be forced through the device. When run as a non-reversing engine, the arrangement shown in Fig. 5 is adopted. The ports 9 and 13 in the cylinder are cut off, while 11 becomes a steam port, and 10 and 12 the exhaust ports. In the piston the ports 25ª and 26ª are the inlet ports also utilized as exhaust ports, while 24 and 27 are only exhaust ports. By arranging the ports 25ª and 26ª shorter than the actual length of stroke of the piston, it is easy to arrange for an early cut-off of the steam or fluid and so work the engine expansively. In this case on the engine running the port 25ª will come over the port 11 and admit steam to one end of the cylinder, while the ports 24 and 26ª will come over the ports 10 and 12 and so act as the exhaust. In the return stroke the port 26ª will come over the port 11 and the ports 25ª and 27 over the ports 10 and 12. Thus, again, it will be seen that there are two ports arranged both as steam and exhaust ports, and two others simply as exhaust ports. It is now found possible to give a certain amount of lead to the valves by recessing the same somewhat, as is shown in Fig. 5 at 28.

It will be noted that connected to each of the ports 9, 10, 11, 12 and 13 in the cylinder there is a connection $h$ connected by means of a cock or valve $j$ to the exhaust and steam pipes $l$ and $m$, respectively, whereby any of the ports in the cylinder can be connected to either the steam fluid pressure supply or the exhaust, or cut out of action. In short, in Fig. 1, for a single expansion engine port 11 is the inlet port and 10 and 12 are the exhaust ports. To make it a reversible engine 10 and 12 are inlet ports and 11 and 9 or 11 and 13 are exhaust ports according to the way the engine is running. If the apparatus at any time is required to be run as a pump, what were formerly exhaust ports must be connected with the water to be pumped, and what were formerly the steam ports must be connected with the cistern into which the water has to be pumped, then instead of the fluid driving the engine, and the engine driving machinery through shaft D by pulley $p$ or the other pulley, either of these pulleys is connected by a belt with the power shaft, and the engine drives the fluid.

We declare that what we claim is:

1. The combination of a cylinder, a piston therein, a shaft, means connecting said piston to said shaft in such manner that the piston both reciprocates longitudinally and oscillates circumferentially while the shaft rotates continuously, a plurality of ports spaced at equal distances apart circumferentially in the cylinder, the alternate ports serving as inlet and outlet ports respectively, a plurality of ports in the piston spaced at equal distances apart circumferentially and so made that the alternate ports communicate respectively with one end and the other of the piston, the spacing of the respective ports being such that the oscillating movements of the piston will move the piston ports through the distance necessary to bring them from over one cylinder port to a position over the next cylinder port, and back again to the first cylinder port.

2. The combination of a cylinder, a piston therein, a shaft, means connecting said piston to said shaft in such manner that the piston both reciprocates longitudinally and oscillates circumferentially while the shaft rotates continuously, a plurality of ports spaced at equal distances apart circumferentially in the cylinder, inlet and outlet passages and means for connecting said ports either to the inlet or the outlet as required, a plurality of ports in the piston spaced at equal distances apart circumferentially and so made that the alternate ports communicate respectively with one end and the other of the piston, the spacing of the respective ports being such that the oscillating movements of the piston will move the piston ports through the distance necessary to bring them from over one cylinder port to a position over the next cylinder port, and back again to the first cylinder port.

3. The combination of a cylinder, a piston therein, a shaft, means connecting said piston to said shaft in such manner that the piston both reciprocates longitudinally and oscillates circumferentially while the shaft rotates continuously, a plurality of ports spaced at equal distances apart circumferentially in the cylinder, inlet and outlet passages, means connecting the outlet passages to the odd ports and the inlet passages to the intermediate even ports respectively, a plurality of ports in the piston spaced at equal distances apart circumferentially and so made that the alternate ports communicate respectively with one end and the other of the piston, the spacing of the respective ports being such that the oscillating movements of the piston will move the piston ports through the distance necessary to bring them from over one cylinder port to a position over the next cylinder port, and back again to the first cylinder port.

4. The combination of a cylinder, a piston therein, a shaft, means connecting said piston to said shaft in such manner that the piston both reciprocates longitudinally and oscillates circumferentially while the shaft rotates continuously, three ports spaced at equal distances apart circumferentially in the cylinder, means connecting the middle one of said ports to the inlet and the two outer ones to the outlet, four ports in the piston spaced at equal distances apart circumferentially and so made that the alternate ports communicate respectively with one end and the other of the piston, the spacing of the respective ports being such that the oscillating movements of the piston will move the piston ports through the distance necessary to bring them from over one cylinder port to a position over the next cylinder port, and back again to the first cylinder port, whereby both of the piston ports for each end of the cylinder are caused to serve as outlet ports while only one thereof serves as the inlet port.

In witness whereof, we have hereunto signed our names these 13th and 15th days of February 1907, respectively, in the presence of two subscribing witnesses.

THOMAS MOSS.
WILLIAM MOSS.

Witnesses to the signature of Thomas Moss:
ALFRED BRACEWELL,
JOHN MCGLYNN.

Witnesses to the signature of William Moss:
HUBERT PUMPHREY,
RICH'D L. CLEAVER.